US011780300B2

(12) United States Patent
Hatta et al.

(10) Patent No.: US 11,780,300 B2
(45) Date of Patent: Oct. 10, 2023

(54) FIXED WINDOW GLASS WITH DIVISION BAR

(71) Applicant: AGC Inc., Tokyo (JP)

(72) Inventors: Naonori Hatta, Tokyo (JP); Ryoichi Urata, Tokyo (JP); Kazuhiro Takahashi, Tokyo (JP); Yoshio Kosaka, Tokyo (JP)

(73) Assignee: AGC INC., Tokyo (JP)

( * ) Notice: Subject to any disclaimer, the term of this patent is extended or adjusted under 35 U.S.C. 154(b) by 0 days.

(21) Appl. No.: 17/185,830

(22) Filed: Feb. 25, 2021

(65) Prior Publication Data

US 2021/0260971 A1    Aug. 26, 2021

(30) Foreign Application Priority Data

Feb. 26, 2020  (JP) ................................ 2020-030757

(51) Int. Cl.
*B60J 1/10*     (2006.01)
*B60J 5/04*     (2006.01)
*B60J 1/17*     (2006.01)

(52) U.S. Cl.
CPC . *B60J 1/10* (2013.01); *B60J 1/17* (2013.01); *B60J 5/0402* (2013.01)

(58) Field of Classification Search
CPC .................................. B60J 10/78; B60J 1/10
See application file for complete search history.

(56) References Cited

U.S. PATENT DOCUMENTS

| 4,653,230 A * | 3/1987 | Seo ........................... B60J 10/79 49/374 |
| 7,854,094 B2 * | 12/2010 | Zimmer .................... B60J 10/26 49/440 |
| 2005/0188622 A1 * | 9/2005 | Nestell ...................... B60J 10/78 49/441 |
| 2012/0144751 A1 * | 6/2012 | Schapitz ................. B60J 10/265 49/431 |
| 2012/0167473 A1 * | 7/2012 | Schapitz .................. B60J 10/30 49/431 |
| 2013/0160374 A1 * | 6/2013 | Kuwabara ................ B60J 10/79 49/440 |

(Continued)

FOREIGN PATENT DOCUMENTS

| CA | 2759554 A1 * | 6/2012 | .............. B60J 10/16 |
| DE | 20006771 U1 * | 8/2001 | .............. B60J 10/24 |

(Continued)

*Primary Examiner* — Marcus Menezes
(74) *Attorney, Agent, or Firm* — Foley & Lardner LLP

(57) ABSTRACT

A fixed window glass with a division bar, includes a fixed window glass adapted to be fixed to a vehicle and having an edge portion; and a division bar attached to the edge portion, the division bar comprising a guide portion formed in a U-shaped in section configured to guide elevating and lowering movement of an elevating window glass; wherein the division bar further comprises a first member fixed to the edge portion of the fixed window glass, and a second member to be attachable to the first member from an exterior side of the vehicle; and wherein the second member is attached to the first member, and the division bar has an exterior side surface exposed on the exterior side of the vehicle such that the exposed exterior side surface forms a flush surface.

12 Claims, 8 Drawing Sheets

(56) References Cited

U.S. PATENT DOCUMENTS

| | | | | |
|---|---|---|---|---|
| 2015/0165884 A1* | 6/2015 | Lee | ......................... | B60J 10/76 |
| | | | | 49/504 |
| 2017/0113393 A1* | 4/2017 | Krueger | ................ | B29C 48/022 |
| 2020/0338972 A1* | 10/2020 | Zia | ........................... | B60J 10/18 |
| 2021/0260976 A1* | 8/2021 | Fukushima | .............. | B60J 10/78 |

FOREIGN PATENT DOCUMENTS

| | | | | | |
|---|---|---|---|---|---|
| DE | 102017004131 A1 | * | 10/2018 | | |
| EP | 2463134 A1 | * | 6/2012 | .............. | B60J 10/16 |
| EP | 2614977 A1 | * | 7/2013 | ............. | B60J 10/235 |
| GB | 2422398 A | * | 7/2006 | .............. | B60J 10/00 |
| JP | 3992743 B2 | | 10/2007 | | |
| JP | 6134010 B2 | | 5/2017 | | |
| JP | 2019-073083 A | | 5/2019 | | |
| WO | WO-9747456 A1 | * | 12/1997 | ....... | B29C 45/14467 |
| WO | WO-2019016480 A1 | * | 1/2019 | .............. | B60J 10/76 |
| WO | WO-2019074092 A1 | * | 4/2019 | | |
| WO | WO-2019/116818 A1 | | 6/2019 | | |

\* cited by examiner

FIXED WINDOW GLASS WITH DIVISION BAR

CROSS-REFERENCE TO RELATED APPLICATION

The entire disclosure of Japanese Patent Application No. 2020-030757 filed on Feb. 26, 2020 including specification, claims, drawings and summary is incorporated herein by reference in its entirety.

TECHNICAL FIELD

The present invention relates to a fixed window glass with a division bar.

BACKGROUND ART

As a window glass to be mounted to a vehicle window frame, there are an elevating window glass and a non-elevating, fixed window glass. When an elevating window glass and a fixed window glass are disposed to be adjacent to each other, it is known that the fixed window glass has a division bar disposed on an edge portion, and the elevating window glass is disposed so as to be slidable on a guide portion of the division bar (see Patent Document 1 etc.).

Patent Document 1 discloses a glass plate module which includes a glass plate having sides on an outer edge, a molding member fixed to at least one side of the glass plate adjacent to the elevating window glass among the sides, a guide member fixed to the molding member so as to extend along the at least one side of the glass plate, and a cover member fixed to the guide member so as to be directed toward an exterior side of a vehicle.

The glass plate module according to Patent Document 1 prevents the cover member from being scratched during molding the molding member by adopting an arrangement that the cover member, to which a design is applied, is separated from the guide member, and the cover member is fixed to the molding member and the guide member afterward, i.e., after molding the molding member.

PRIOR ART DOCUMENTS

Patent Documents

Patent Document 1: JP-A-2019-73083

DISCLOSURE OF INVENTION

Technical Problem

Nevertheless, such a fixed window glass with a division bar, which includes a division bar in the above-mentioned separate structure, has a problem in that wind noise is generated at the division bar when the vehicle is running for example, because the cover member is a member to be fixed afterward.

The present invention is proposed in consideration with such circumstances. It is an object of the present invention to provide a fixed window glass with a division bar, which is capable of reducing the generation of wind noise in the fixed window glass with a division bar configured in a separate structure.

Solution to Problem

According to one aspect of the present invention, in order to achieve the above-mentioned object, there is provided a fixed window glass with a division bar, which includes a fixed window glass adapted to be fixed to a vehicle and having an edge portion; and a division bar attached to the edge portion, the division bar comprising a guide portion formed in a U-shaped in section configured to guide elevating and lowering movement of an elevating window glass; wherein the division bar further includes a first member fixed to the edge portion of the fixed window glass, and a second member to be attachable to the first member from an exterior side of the vehicle; and wherein the second member is attached to the first member, and the division bar has an exterior side surface exposed on the exterior side of the vehicle such that the exposed exterior side surface forms a flush surface.

Advantageous Effects of Invention

In accordance with the present invention, it is possible to reduce the generation of wind noise in a fixed window glass with a division bar configured in a separate structure.

DESCRIPTION OF EMBODIMENTS

Now, embodiments of the present invention will be described in reference to the accompanying drawings.

In Description, the wordings of "upward", "downward", "vertical", "horizontal", "interior", "exterior", "forward" and "rearward", which are indicative of directions or positions, mean upward, downward, vertical, horizontal, interior, exterior, forward and rearward when a fixed window glass with a division bar is mounted to a vehicle.

Figure 1:
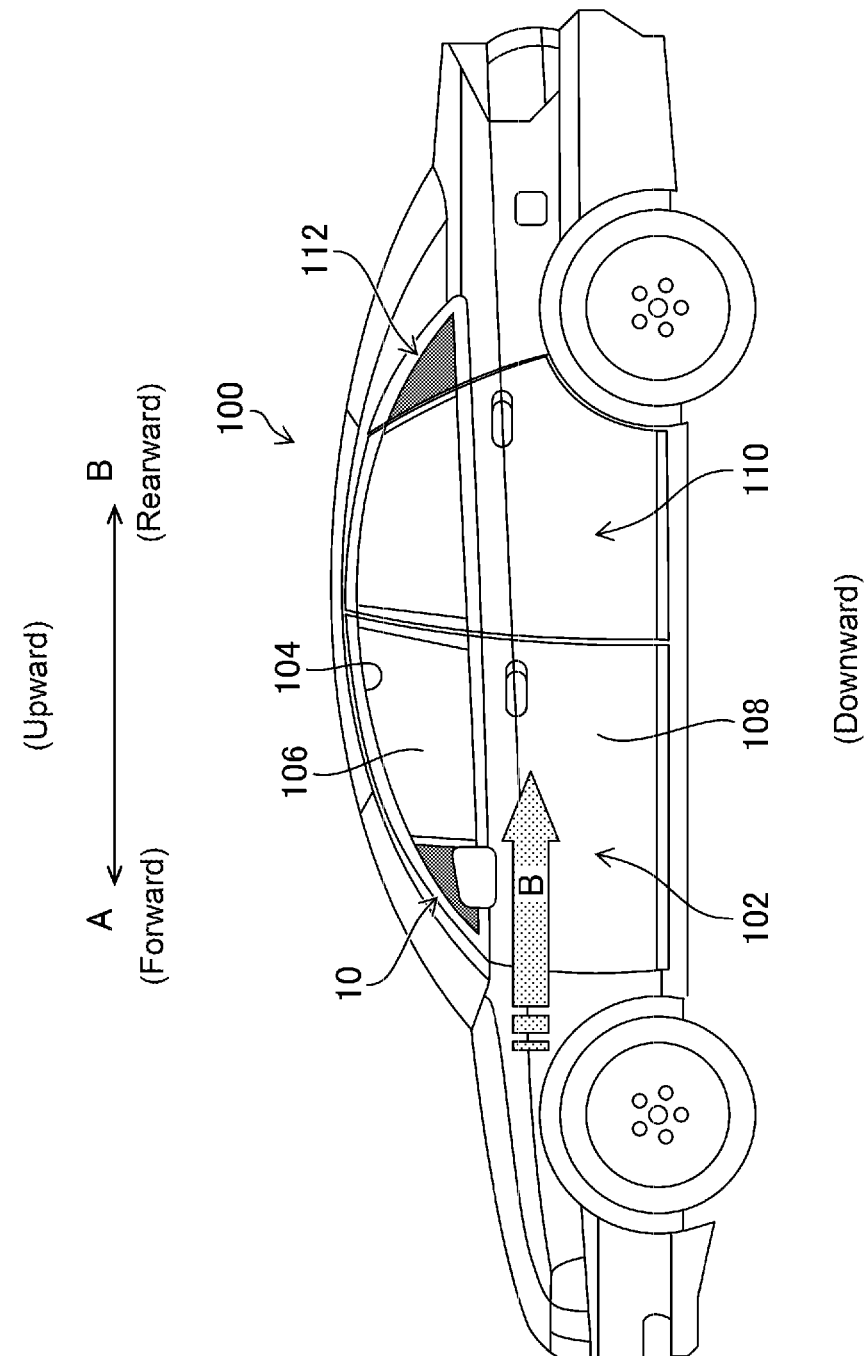
FIG. 1 is a left side view of a vehicle, which includes the fixed window glass with a division bar according to a first embodiment of the present invention.
Figure 2:
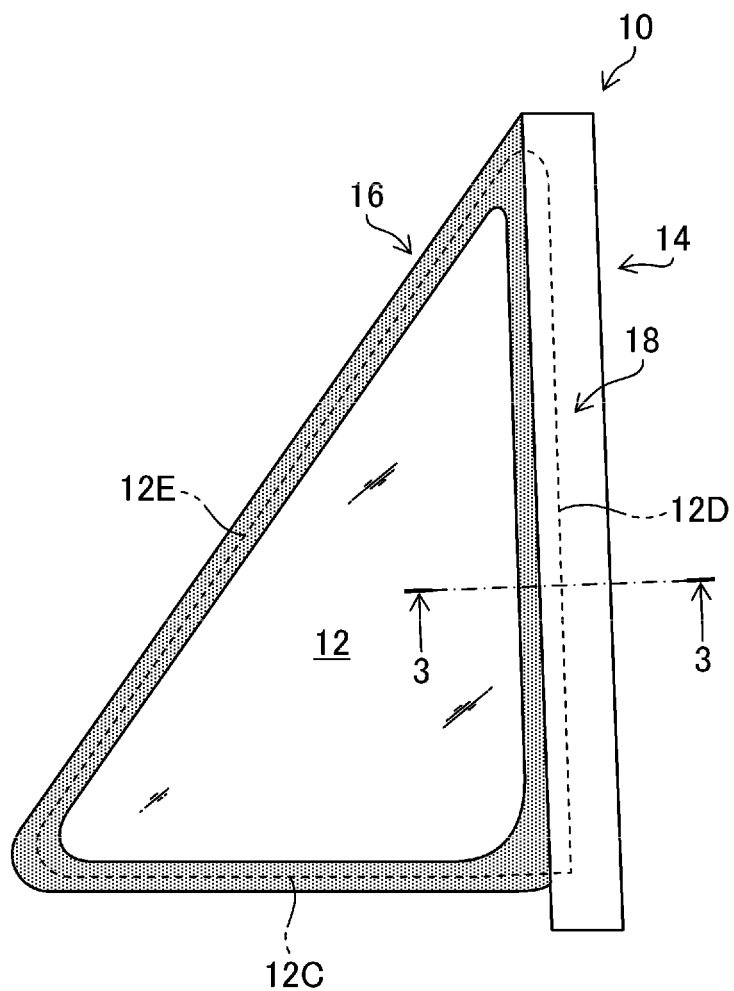
FIG. 2 is a front view of the fixed window glass with a division bar according to the first embodiment.

FIG. 1 is a left side view of a vehicle 100, which includes the fixed window glass with a division bar 10 according to a first embodiment of the present invention. FIG. 2 is a front view of the fixed window glass with a division bar 10, wherein the fixed window glass with a division bar 10 is shown in enlargement.

The fixed window glass with a division bar 10 shown in FIG. 1 is applied to a front bench glass to be mounted to a window opening 104 of a front side door 102 of the vehicle 100 as an example. The fixed window glass with a division bar 10 is mounted adjacent and a forward side with respect to an elevating window glass 106 disposed in the front side door 102. The elevating window glass 106 is coupled to an elevating and lowering device (not shown) disposed in a door panel 108 of the front side door 102 and is elevated or lowered by a driving force given from the elevating and lowering device to open or close the window opening 104.

Figure 3:
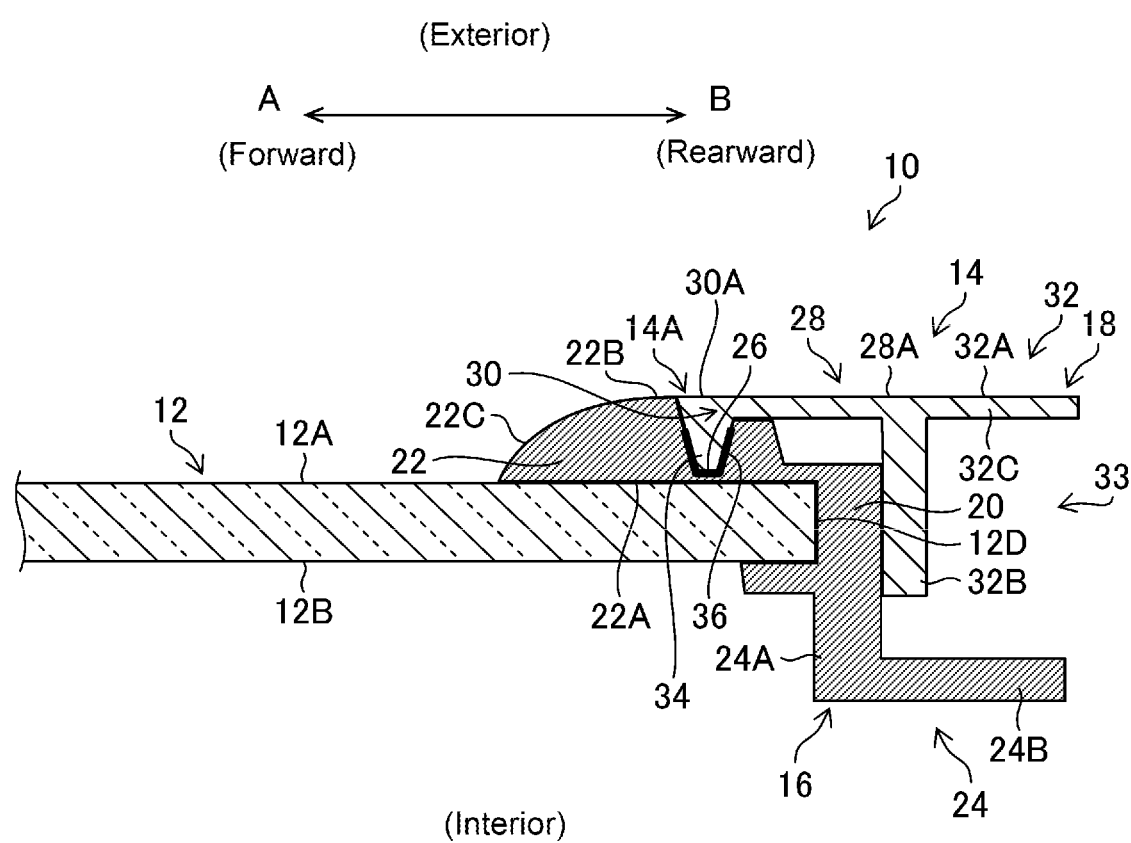
FIG. 3 is a cross-sectional view taken along line 3-3 of FIG. 2.

FIG. 3 is a cross-sectional view of the fixed window glass with a division bar 10 shown in FIG. 2, which is taken along line 3-3 of FIG. 2. The embodiments will be described about examples where the fixed window glass with a division bar 10 includes a fixed window glass 12 made of a single glass plate.

As shown in FIGS. 2 and 3, the fixed window glass 12 is formed in a substantially triangular shape as seen in a front view of the fixed window glass and includes an exterior side surface 12A and an interior side surface 12B. The fixed window glass also includes a horizontal portion 12C, a vertical portion 12D and a hypotenuse portion 12E so as to form a peripheral edge portion of the fixed window glass 12. It should be noted that the fixed window glass 12 is not limited to be formed in such a shape. For example, the hypotenuse portion 12E may be curved, not linear. The horizontal portion 12C may extend in a substantially horizontal manner, and the vertical portion 12D may extend in a substantially vertical manner.

As shown in FIGS. 1 and 2, the fixed window glass with a division bar 10 includes a division bar 14. The division bar 14 is attached to the fixed window glass 12 along the vertical portion 12D, which is positioned on a rearward side of the fixed window glass.

As shown in FIGS. 2 and 3, the division bar 14 includes a frame 16 fixed to the peripheral edge portion of the fixed window glass 12, and a bar body 18 configured to be attachable to the frame 16 from an exterior side of the vehicle. The division bar 14 is configured as a division bar in a separate structure, wherein the division bar is configured by fixing the frame 16 to the vertical portion 12D of the fixed window glass 12, followed by attaching the bar body 18 to the frame.

The frame 16 is an example of a first member as an element of the present invention while the bar body 18 is an example of a second member as an element of the present invention. The first member forming the division bar is not limited to the frame 16 shown in FIG. 2, which may be a band-shaped member fixed to and along only the vertical portion 12D. The following explanation will be made about an example where the first member is the frame 16.

The fixed window glass 12 and the frame 16 may be manufactured by a process called MAW (Module Assy Window: trademark) for example. The MAW process is a process wherein the frame 16 made of a thermoplastic resin is integrally molded to the peripheral edge portion of the fixed window glass 12 by injection molding. By this process, the frame 16 is fixed to the fixed window glass 12 so as to wrap the peripheral edge portion of the fixed window glass 12 in a thickness direction of the fixed window glass 12.

The fixed window glass 12 may be made of inorganic glass or organic glass. As the inorganic glass, soda-lime glass, aluminosilicate glass, borosilicate glass, alkali-free glass and quartz glass are, for example, applicable without particular limitations. Among them, soda-lime glass is particularly preferable in terms of production costs and moldability.

When the fixed window glass 12 is made of inorganic glass, the fixed window glass 12 may be made of either non-tempered glass or tempered glass. The tempered glass may be made of either glass tempered by air quenching or chemically tempered glass. Non-tempered glass is prepared by forming molten glass in a plate shape and annealing the formed glass. The tempered glass is prepared by forming a compressive stress layer in the surface of non-tempered glass. The tempered glass may be either physically tempered glass (such as glass tempered by air quenching) or chemically tempered glass. When the physically tempered glass is used, the physically tempered glass may have a glass surface tempered by quenching a uniformly heated glass plate from a temperature close to its softening point or using treatment other than annealing to produce compressive stress on the glass surface by its temperature difference between the glass surface and the inside of the glass plate. When the chemically tempered glass is used, the chemically tempered glass may have a glass surface tempered by producing compressive stress on the glass surface by an ion exchange method or the like after bending. Glass that absorbs ultra-violet rays or infrared rays is also applicable. Although the fixed window glass is preferably transparent, the fixed window glass may be a glass plate, which is colored to such an extent not to impair the transparency.

When the fixed window glass 12 is made of organic glass, the organic glass may be made of a transparent resin, such as a polycarbonate resin, an acrylic resin (for example, a polymethyl methacrylate resin), a polyvinyl chloride resin, or a polystyrene resin.

The fixed window glass 12 may be made of laminated glass prepared by bonding at least two glass plates via an interlayer. The interlayer of the laminated glass may be, for example, a known film made of PVB (poly vinyl butyral) or EVA (ethylene vinyl acetate copolymer). The interlayer of the laminated glass may be a transparent interlayer or a colored interlayer. The interlayer may have at least two films.

When the fixed window glass 12 is mounted to the vehicle, the fixed window glass 12 may be formed in a bent shape to be convex toward the exterior side of the vehicle. The fixed window glass 12 may be formed in a single bent shape to be bent toward a single direction or in a complex bent shape to be curved in two orthogonal directions.

The fixed window glass 12 may be bent by, e.g., gravity bending, press bending or roller bending. Although there is also no particular limitation to how to bend the fixed window glass 12, it is preferable to use a glass plate formed by a float process or the like when the fixed window glass is made of inorganic glass for example.

Although there is no particular limitation to the thickness of the fixed window glass 12, the thickness is preferably at least 0.5 mm and at most 5.0 mm.

The material forming the frame 16 may be a thermoplastic elastomer made of a resin of PP (polypropylene) or PVC (polyvinyl chloride) for example. The thermoplastic elastomer may be a thermoplastic elastomer containing fibers, such as glass fibers or carbon fibers. The first member is not limited to one made of a resin. The first member may be one made of a metal, such as aluminum.

The bar body 18 is formed in a band-shape and is attached to the frame 16 from the exterior side of the vehicle as described later. The bar body 18 may be made of a resin or a metal, such as aluminum, as in the frame 16.

The fixed window glass with a division bar 10 according to the first embodiment may include the following arrangement to reduce the generation of wind noise caused during the running of the vehicle 100 in the above-mentioned separate structure.

As described above, the division bar 14 includes the frame 16 fixed to the peripheral edge portion of the fixed window glass 12, and the bar body 18 configured to be attachable to the frame 16 from the exterior side of the vehicle. As shown in FIG. 3, the division bar 14 is configured such that the exterior side surface 14A, which is exposed when the bar body 18 is attached to the frame 16, forms a flush surface.

In Description, the wording "flush surface" means a stepless flush surface or a flush surface with a step having a depth of, e.g., at most 1 mm even when the surface has such a step.

When the exterior side surface 14A exposed toward the exterior side of the vehicle forms a flush surface as described above, an air stream that flows along the division bar 14 during the running of the vehicle 100 flows smoothly along the exterior side surface 14A as a flush surface because the exterior side surface 14A has no obstacle, such as a step, thereon. Thus, it is possible to prevent wind noise from being caused during the running of the vehicle 100 or to minimize the generation of wind noise.

The division bar 14 according to the first embodiment includes the following specific arrangement to achieve the above-mentioned advantages.

As shown in FIG. 3, the frame 16 includes a fixing portion 20 fixed to the edge portion (vertical portion 12D) of the fixed window glass 12, a joining portion 22 formed integrally with the fixing portion 20 and disposed to extend along the exterior side surface 12A of the fixed window glass 12, and a first guide member 24 formed integrally with the fixing portion 20 and disposed on an interior side of the fixed window glass 12.

The fixing portion 20 is formed in a U-shaped in section so as to wrap the fixed window glass 12 in the thickness direction.

The joining portion 22 includes an interior side surface 22A brought into close contact with the exterior side surface 12A of the fixed window glass 12, and an exterior side surface 22B having a concave portion 26. The joining portion 22 is formed to provide a curved surface toward the exterior side surface 12A of the fixed window glass 12 in a cross-sectional view. In other words, the exterior side surface 22B of the joining portion 22 has a tapered surface 22C formed thereon.

The first guide member 24 includes a convex portion 24A projecting from the fixing portion 20 toward an interior side of the vehicle, and a convex portion 24B projecting from the convex portion 24A rearward (direction indicated by arrow B). The first guide member is formed in an L-shaped in section.

The bar body 18 includes a body portion 28 having a decorative surface on an exterior side surface 28A, a joined portion 30 formed integrally with the body portion 28 so as to be configured to be joined to the joining portion 22 on the exterior side surface 12A of the fixed window glass 12, and a second guide member 32 formed integrally with the body portion 28 so as to be disposed on an exterior side of the fixed window glass 12.

The exterior side surface 28A of the body portion 28 is flat and flush such that the joined portion 30 and the second guide member 32 have an exterior side surface 30A and an exterior side surface 32A, respectively, both exterior side surfaces forming a flush surface.

The joined portion 30 has a convex portion 34 formed on an interior side surface so as to be engageable with the concave portion 26. As shown in FIG. 3, when the convex portion 34 is engaged with the concave portion 26, the exterior side surfaces 22B, 28A, 30A and 32A of the joining portion 22, the body portion 28, the joined portion 30 and the second guide member, which are exposed to the exterior side of the vehicle, are configured to form a flush surface with one another. In other words, the division bar 14 has an exterior side surface 14A formed of the exterior side surfaces 22B, 28A, 30A and 32A.

The second guide member 32 includes a convex portion 32B projecting from the body portion 28 toward the interior side of the vehicle, and a convex portion 32C projecting from the body portion 28 rearward (direction indicated by the arrow B). The second guide member is formed in an L-shaped in section. When the convex portion 34 is engaged with the concave portion 26 as described above, the convex portion 32B is brought into close contact with the fixing portion 20, and the first guide member 24 and the second guide member 32 form a guide portion 33, which is formed in a U-shaped in section. The elevating window glass 106 (see FIG. 1) has a forward edge portion received in the guide portion 33 such that the elevating and lowering movement of the elevating window glass 106 (see FIG. 1) is guided. It should be noted that the guide portion 33 has a well-known glass run 35 (see FIG. 8) disposed therein.

In accordance with the division bar 14 of the first embodiment, the convex portion 34 is engaged with the concave portion 26 to form the guide portion 33. In this embodiment, the exterior side surfaces 22B, 28A, 30A and 32A of the joining portion 22, the body portion 28, the joined portion 30 and the second guide member, which are exposed to the exterior side of the vehicle, are configured to form a flush surface with one another. Thus, it is possible to achieve the above-mentioned advantages, i.e., the advantages of preventing wind noise from being caused during the running of the vehicle 100 or minimizing the generation of wind noise.

The exterior side surface 22B of the joining portion 22 has the tapered surface 22C. By the provision of the tapered surface, an air stream that flows from a forward side toward a rear side, i.e., flows from a forward side toward a rear side of the vehicle (see the air stream indicated by arrow B in FIG. 1) smoothly flows from the exterior side surface 12A of the fixed window glass 12 along the exterior side surfaces 22B, 30A, 28A and 32A via the tapered surface 22C. The provision of the tapered surface 22C on the exterior side surface 22B of the joining portion 22 can stabilize the air stream to further enhance the above-mentioned advantages.

It is preferred that a buffer material 36 softer than the joining portion 22 and the joined portion 30 be interposed between joining surfaces of the concave portion 26 and the convex portion 34 as shown in FIG. 3. In this case, it is possible to avoid the generation of a rubbing sound (unusual sound) caused by direct contact between the concave portion 26 and the convex portion 34. The buffer material 36 may be a flexible rubber sheet as an example.

Although described in detail later, the frame 16 and the bar body 18 may be bonded together by an adhesive 38 by interposing the adhesive between the frame 16 and the bar body 18 (see FIG. 6). In this case, it is possible to enhance the fixing force between the frame 16 and the bar body 18. As the adhesive 38, a double-sided adhesive tape is applicable as an example, and a known adhesive, such as a urethane-based adhesive, a silicone-based adhesive or an acrylic adhesive is also applicable.

Figure 4:
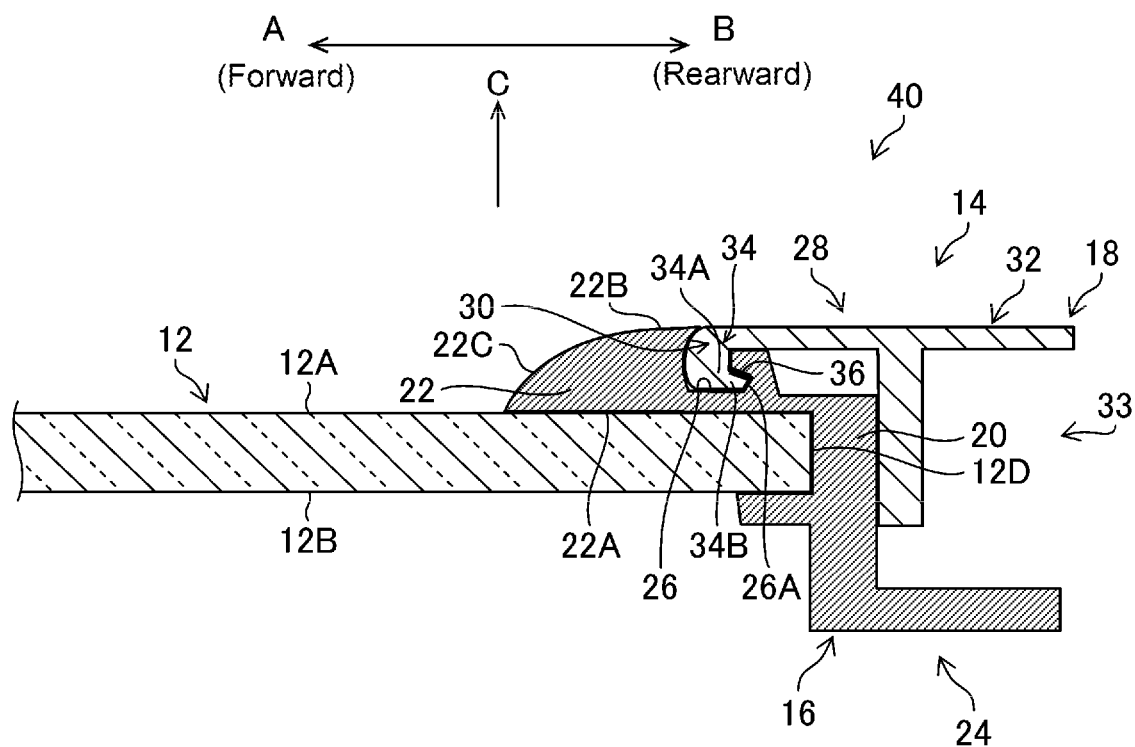
FIG. 4 is a cross-sectional view of the fixed window glass with a division bar according to a second embodiment of the present invention.

FIG. 4 is a cross-sectional view of the fixed window glass with a division bar 40 according to a second embodiment of the present invention. In the explanation of the fixed window glass with a division bar 40, the explanation will be made with parts or members identical or similar to those of the fixed window glass with a division bar 10 according to the first embodiment shown in FIG. 3 being denoted by like reference numerals. For simple explanation, different parts or members from the fixed window glass with a division bar 10 will be mainly described.

In the fixed window glass with a division bar 40 shown in FIG. 4, the joined portion 30 includes a convex portion 34. The convex portion 34 includes a projecting portion 34A projecting toward the exterior side surface 12A of the fixed window glass 12 along a normal line C of the exterior side surface 12A of the fixed window glass 12. The convex portion 34 also includes a folded-back portion 34B projecting rearward (direction indicated by arrow B) from a leading edge of the projecting portion 34A in a direction orthogonal to the normal line C of the exterior side surface 12A of the fixed window glass 12.

The concave portion 26 of the joining portion 22 includes a dent portion 26A engageable with the folded-back portion 34B.

The joined portion 30 can thus include the folded-back portion 34B on the convex portion 34 to prevent the bar body 18 from getting out, with respect to the frame 16, in the direction of the normal line C of the exterior side surface 12A of the fixed window glass 12. It should be noted that the frame 16 and the bar body 18 may be bonded together by an adhesive 38 (see FIG. 6) in the second embodiment as well.

Figure 5:
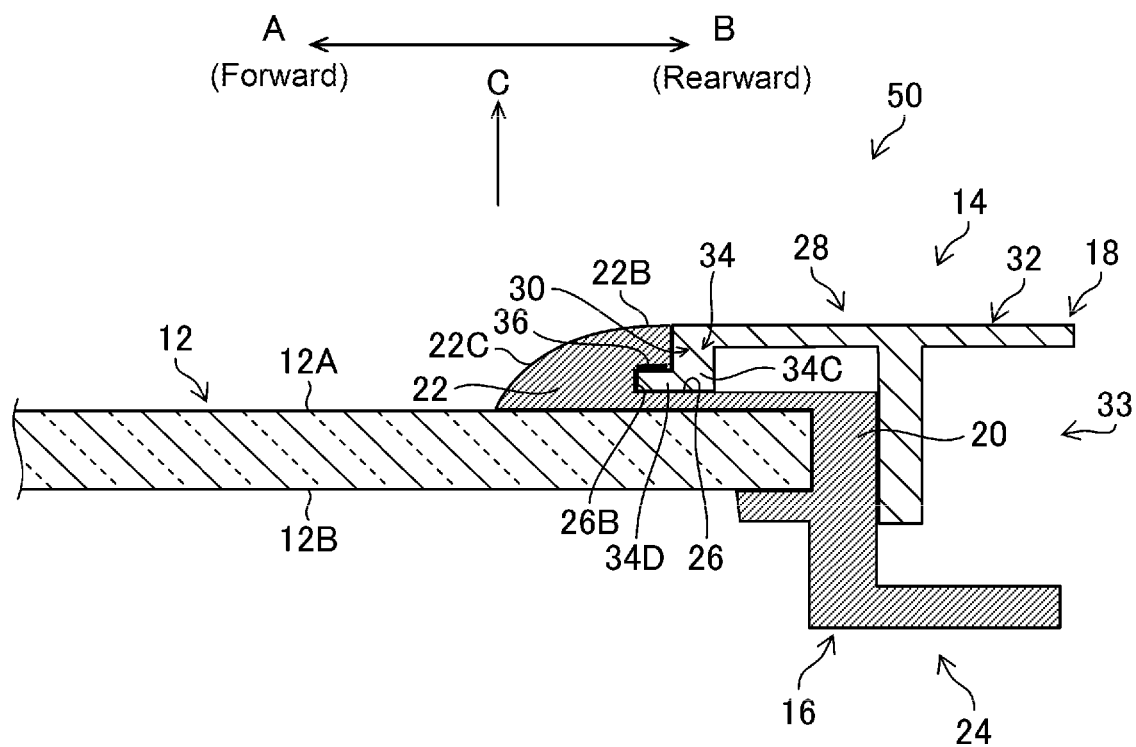
FIG. 5 is a cross-sectional view of the fixed window glass with a division bar according to a third embodiment of the present invention.

FIG. 5 is a cross-sectional view of the fixed window glass with a division bar 50 according to a third embodiment of the present invention. In the explanation of the fixed window glass with a division bar 50, the explanation will be made with parts or members identical or similar to those of the fixed window glass with a division bar 40 according to the second embodiment shown in FIG. 4 being denoted by like reference numerals. For simple explanation, different parts or members from the fixed window glass with a division bar 40 will be mainly described.

In the fixed window glass with a division bar 50 shown in FIG. 5, the joined portion 30 includes a convex portion 34. The convex portion 34 includes a projecting portion 34C projecting toward the exterior side surface 12A of the fixed window glass 12 along the normal line C of the exterior side surface 12A of the fixed window glass 12. The convex portion 34 also includes a folded-back portion 34D projecting forward (direction indicated by arrow A) from a leading edge of the projecting portion 34C in a direction orthogonal to the normal line C of the exterior side surface 12A of the fixed window glass 12.

The joining portion 22 includes a concave portion 26, which has a dent portion 26B engageable with the folded-back portion 34D in an in-plane direction of the fixed window glass 12. Because the joined portion 30 includes the folded-back portion 34D on the convex portion 34, and because the concave portion 26 includes the dent portion 26B, the joining portion 22 and the joined portion 30 can be joined with each other by bringing the frame 16 and the bar body 18 closer to each other along the in-plane direction of the fixed window glass 12. Further, the bar body 18 can be prevented from getting out in a direction of the normal line C with respect to the frame 16. It should be noted that the frame 16 and the bar body 18 may be bonded by the adhesive 38 (see FIG. 6) in the third embodiment as well.

Figure 6:
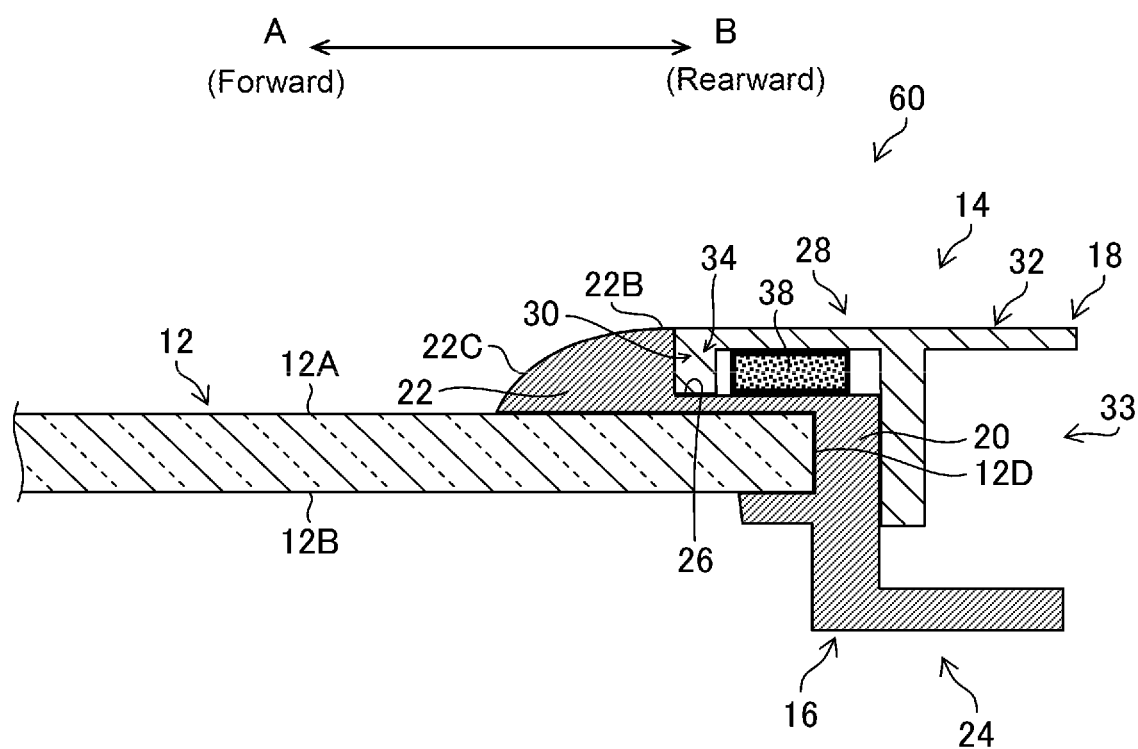
FIG. 6 is a cross-sectional view of the fixed window glass with a division bar according to a fourth embodiment of the present invention.

FIG. 6 is a cross-sectional view of the fixed window glass with a division bar 60 according to a fourth embodiment of the present invention. In the explanation of the fixed window glass with a division bar 60, the explanation will be made with parts or members identical or similar to those of the fixed window glass with a division bar 10 according to the first embodiment shown in FIG. 3 being denoted by like reference numerals. For simple explanation, different parts of members from the fixed window glass with a division bar 10 will be mainly described.

The fixed window glass with a division bar 60 shown in FIG. 6 has an adhesive 38 interposed between the frame 16 and the bar body 18 such that the frame 16 and the bar body 18 are fixed together by the adhesive 38.

The use of the adhesive 38 can enhance the fixing force between the frame 16 and the bar body 18. It should be noted that the concave portion 26 shown in FIG. 6 functions as a concave portion for housing a convex portion 34 and the adhesive 38.

Figure 7:
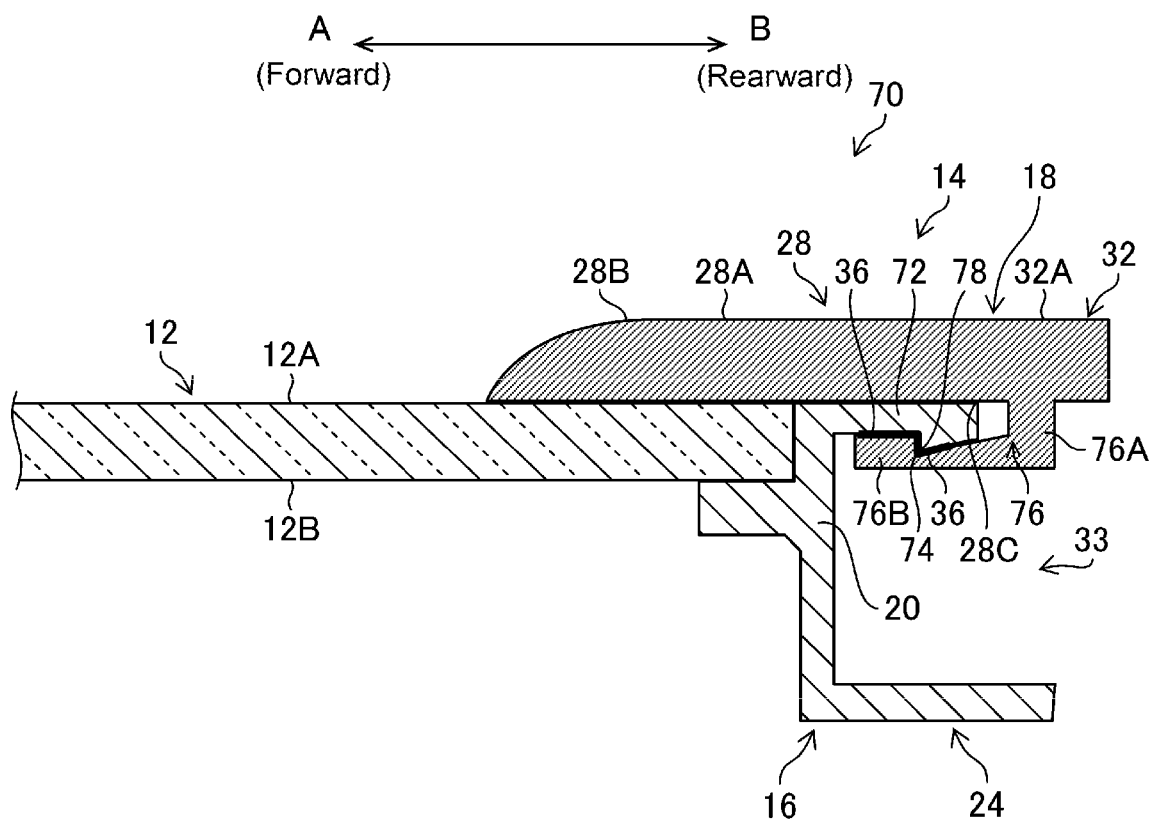
FIG. 7 is a cross-sectional view of the fixed window glass with a division bar according to a fifth embodiment of the present invention.

FIG. 7 is a cross-sectional view of the fixed window glass with a division bar 70 according to a fifth embodiment of the present invention. In the explanation of the fixed window glass with a division bar 70, the explanation will be made with parts or members identical or similar to those of the fixed window glass with a division bar 10 according to the first embodiment shown in FIG. 3 being denoted by like reference numerals. For simple explanation, different parts or members from the fixed window glass with a division bar 10 will be mainly described.

The frame 16 includes a fixing portion 20, a joining portion 72 and a first guide member 24.

The joining portion 72 is integrally formed with the fixing portion 20 and is disposed so as to extend outward of the fixed window glass 12 (rearward direction indicated by arrow B) along the in-plane direction of the fixed window glass 12. The joining portion 72 has a pawl portion 74 disposed on an interior side surface so as to project toward the interior side of the vehicle. Although it is shown that the joining portion 72 has an exterior side surface disposed so as to flush with the exterior side surface 12A of the fixed window glass 12, the shown mode is one example, and the present invention is not limited to this mode.

In contrast, the bar body 18 includes a body portion 28, a joined portion 76 and a second guide member 32.

The body portion 28 includes a front edge portion (edge portion disposed in a direction denoted by arrow A) formed to provide a curved surface toward the exterior side surface 12A of the fixed window glass 12 in section. In other words, the front edge portion of the body portion 28 has a tapered surface 28B.

The joined portion 76 is integrally formed with the body portion 28 and includes a convex portion 76A projecting from an interior side surface 28C of the body portion 28 and a convex portion 76B projecting from the convex portion 76A toward an inner portion of the fixed window glass 12. The joined portion has an L-shaped in section. The convex portion 76B has a concave portion 78 formed on an exterior side surface so as to be engageable with the pawl portion 74.

According to the fixed window glass with a division bar 70 shown in FIG. 7, the joining portion 72 and the joined portion 76 are brought into closer along the in-plane direction of the fixed window glass 12 to bring the pawl portion 74 and the concave portion 78 into engagement such that the joining portion 72 and the joined portion 76 are bonded together. In this embodiment, it is possible to prevent wind noise from being generated or to minimize the generation of wind noise since exterior side surfaces 28A and 32A of the body portion 28 and the second guide portion 32, which are exposed to the exterior side of the vehicle, form a flush surface with each other. The body portion 28 can enhance the above-mentioned advantage because of having the tapered surface 28B. It should be noted that the frame 16 and the bar body 18 may be bonded together by an unshown adhesive in the fifth embodiment as well.

Figure 8:
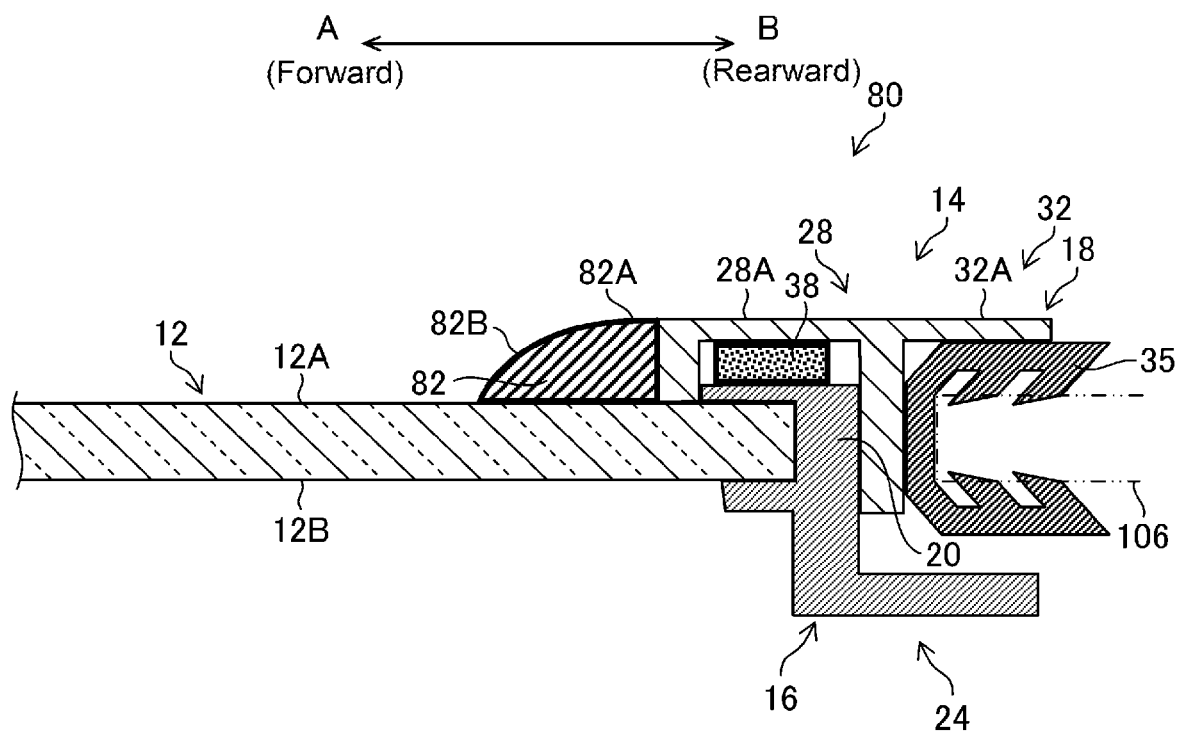
FIG. 8 is a cross-sectional view of the fixed window glass with a division bar according to a sixth embodiment of the present invention.

FIG. 8 is a cross-sectional view of the fixed window glass with a division bar 80 according to a sixth embodiment of the present invention. In the explanation of the fixed window glass with a division bar 80, the explanation will be made with parts or members identical or similar to those of the fixed window glass with a division bar 10 according to the first embodiment shown in FIG. 3 being denoted by like reference numerals. For simple explanation, different parts or members of the fixed window glass with a division bar 10 will be mainly described.

The frame 16 includes a fixing portion 20 and a first guide member 24.

The bar body 18 includes a body portion 28, a lip portion 82 and a second guide member 32.

The lip portion 82 is integrally formed with the body portion 28 so as to extend toward the exterior side surface 12A of the fixed window glass 12. The lip portion 82 is formed to provide a curved surface toward the exterior side 12A of the fixed window glass 12. In other words, the lip portion 82 has an exterior side surface 82A formed as a tapered surface 82B.

The frame 16 and the bar body 18 are attached together by being bonded by an adhesive 38 interposed between the frame 16 and the bar body 18.

In accordance with the fixed window glass with a division bar 80 shown in FIG. 8, when the bar body 18 is attached to the frame 16 by the adhesive 38, it is possible to prevent wind noise from being generated or to minimize the generation of wind noise since exterior side surfaces 28A, 32A and 82A of the body portion 28, the second guide member 32 and the lip portion 82, which are exposed to the exterior side of the vehicle, form a flush surface with one another. The lip portion 82 can enhance the above-mentioned advantage because of having the tapered surface 82C.

It is preferred that the lip portion 82 be made of a resin or rubber more flexible than the body portion 28 to be brought into close contact with the exterior side surface 12A of the fixed window glass 12 by its elasticity. In this case, the body portion 28 and the lip portion 82 may be molded by e.g., two-color molding.

Although explanation has been made about some embodiments of the present invention, the present invention is not limited to the above-mentioned embodiments. Numerous modifications and changes can be made to the embodiment without departing from the scope of the present invention. Now, several modifications will be described.

Although explanation has been made about a case where the fixed window glass with a division bar according to the present invention is applied to a front bench glass, the fixed window glass with a division bar according to the present invention is also applicable to a rear quarter glass or rear bench glass to be mounted to a vehicle.

In each of the fixed window glasses with a division bar 10, 40, 50 and 60 shown in FIGS. 3 to 6, the tapered surface 22C is formed on the joining portion 22 to reduce the generation of wind noise. The tapered surface 22C is one example, and the tapered surface 22C may be formed in an arc shape or quadratic curve shape in section. The tapered surface may be linear in section. In other words, the joining portion 22 may be at least partly formed to have a thickness gradually increasing from in-plane to out-plane of the fixed window glass 12 in section. This arrangement is helpful to reduce the generation of wind noise.

For the same purpose, in the fixed window glass or a division bar 70 shown in FIG. 7, the tapered surface 28B is formed on the body portion 28. This tapered surface 28B is also one example. The tapered surface 28B may be formed in an arc shape or quadratic curve shape in section. The tapered surface may be linear in section. In other words, the body portion 28 may be at least partly formed to have a thickness gradually increasing from in-plane to out-plane of the fixed window glass 12 in section. This arrangement is helpful to reduce the generation of wind noise.

For the same purpose, in the fixed window glass with a division bar 80 shown in FIG. 8, the lip portion 82 has a tapered surface 82B formed thereon. The tapered surface 82B is one example. The tapered surface 82B may be formed in an arc shape or quadratic curve shape in section. The tapered surface may be linear in section. In other words, the lip portion 82 may be at least partly formed to have a thickness gradually increasing from in-plane to out-plane of the fixed window glass 12 in section. This arrangement is helpful to reduce the generation of wind noise.

Although the frame 16 formed of a single member is exemplified as the first member in the embodiments, the first member may be formed of at least two members. Although the bar body 18 formed of a single member is exemplified as the second member, the second member may be also formed of at least two members.

EXPLANATION OF REFERENCE SYMBOLS

10: fixed window glass with division bar, 12: fixed window glass, 12A: exterior side surface, 12B: interior side surface, 12C: horizontal portion, 12D: vertical portion, 12E: hypotenuse portion, 14: division bar, 14A: exterior side surface, 16: frame, 18: bar body, 20: fixing portion, 22: joining portion, 22A: interior side surface, 22B: exterior side surface, 22C: tapered surface, 24: first guide member, 24A: convex portion, 24B: convex portion, 26: concave portion, 26A: dent portion, 26B: dent portion, 28: body portion, 28A: exterior side surface, 28B: tapered surface, 28C: interior side surface, 30: joined portion, 30A: exterior side surface, 32: second guide member, 32A: exterior side surface, 32B: convex portion, 32C: convex portion, 33: guide portion, 34: convex portion, 34A: projecting portion, 34B: folded-back portion, 34C: projecting portion, 34D: folded-back portion, 35: glass run, 36: buffer material, 38: adhesive, 40: fixed window glass with division bar, 50: fixed window glass with division bar, 60: fixed window glass with division bar, 70: fixed window glass with division bar, 72: joining portion, 74: pawl portion, 76: joined portion: 76A: convex portion, 76B: convex portion, 78: concave portion, 80: fixed window glass with division bar, 82: lip portion, 82A: exterior side surface, 82B: tapered surface, 100: vehicle, 102: rear side door, 104: window opening, 106: elevating window glass, 108: door panel

What is claimed is:

1. A fixed window glass assembly, comprising:
a fixed window glass configured to be fixed to a vehicle and having an edge portion; and
a division bar attached to the edge portion, the division bar comprising a guide portion formed in a U-shape in section configured to guide elevating and lowering movement of an elevating window glass;
wherein the division bar further comprises a first member fixed to the edge portion of the fixed window glass, and a second member to be attachable to the first member from an exterior side of the vehicle;
wherein the first member comprises a fixing portion fixed to the edge portion of the fixed window glass, a joining portion formed integrally with the fixing portion and disposed to extend along an exterior side surface of the fixed window glass, and a first guide member formed integrally with the fixing portion and disposed on an interior side of the fixed window glass; the first guide member is formed in an L-shape in section; the first guide member comprises a first convex portion projecting from the fixing portion toward an interior side of the vehicle, and a second convex portion projecting from the first convex portion rearward; the second member comprises a body portion having a decorative surface on an exterior side surface, a joined portion formed integrally with the body portion so as to be configured to be joined to the joining portion on the exterior side surface of the fixed window glass, and a second guide member formed integrally with the body portion so as to be disposed on an exterior side of the fixed window glass; the second guide member is formed in an L-shape in section; the second guide member comprises a first convex portion projecting from the body portion toward the interior side of the vehicle, and a second convex portion projecting from the body portion rearward; the joining portion of the first member comprises an interior side surface brought into close contact with the exterior side surface of the fixed window glass, and further comprises an exterior side surface having a concave portion; the joined portion of the second member comprises a convex portion formed on an interior side surface so as to be engageable with the concave portion of the exterior side surface of the joining portion of the first member; and the first guide member and the second guide member form the guide portion, which is formed in a U-shape in section; and wherein the second member is attached to the first member, and the first member of the division bar has a first exterior side surface and the second member of the division bar has a second exterior side surface, wherein the first exterior side surface and the second exterior side surface are both exposed on the exterior side of the vehicle, wherein the first exterior side surface of the first member and the second exterior side surface of the second member are flush with each other.

2. The fixed window glass assembly according to claim 1, wherein exterior side surfaces of the body portion, the joined portion and the second guide member, which are exposed to the exterior side of the vehicle, form a flush surface with one another.

3. The fixed window glass assembly according to claim 2, wherein the convex portion of the joined portion comprises a projecting portion projecting along a normal line of the exterior side surface of the fixed window glass, and a folded-back portion projecting from a leading edge of the projecting portion in a direction orthogonal to the normal line.

4. The fixed window glass assembly according to claim 1, wherein the joining portion and the joined portion are brought closer to each other along an in-plane direction to join the joining portion and the joined portion together, and exterior side surfaces of the body portion and the second guide member, which are exposed to the exterior side of the vehicle, form a flush surface with one another.

5. The fixed window glass assembly according to claim 2, further comprising a buffer material interposed between joining surfaces of the joining portion and the joined portion, the buffer material being softer than the joining portion and the joined portion.

6. The fixed window glass assembly according to claim 4, further comprising a buffer material interposed between joining surfaces of the joining portion and the joined portion, the buffer material being softer than the joining portion and the joined portion.

7. The fixed window glass assembly according to claim 1, wherein the first member and the second member are bonded together by an adhesive interposed between the first member and the second member.

8. The fixed window glass assembly according to claim 2, wherein the first member and the second member are bonded together by an adhesive interposed between the first member and the second member.

9. The fixed window glass assembly according to claim 4, wherein the first member and the second member are bonded together by an adhesive interposed between the first member and the second member.

10. The fixed window glass assembly according to claim 5, wherein the first member and the second member are bonded together by an adhesive interposed between the first member and the second member.

11. The fixed window glass assembly according to claim 6, wherein the first member and the second member are bonded together by an adhesive interposed between the first member and the second member.

12. The fixed window glass assembly according to claim 2, wherein the joining portion at least partly has a thickness gradually increasing from an in-plane toward an out-plane of the fixed window glass in section.

* * * * *